(12) United States Patent
Chae et al.

(10) Patent No.: US 10,160,308 B2
(45) Date of Patent: Dec. 25, 2018

(54) STRUCTURE OF BRAKE-COOLING DUCT

(71) Applicants: Hyundai Motor Company, Seoul (KR); Kia Motors Corporation, Seoul (KR)

(72) Inventors: Seong-Woo Chae, Hwaseong-si (KR); Jae-Hun Shim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/698,374

(22) Filed: Sep. 7, 2017

(65) Prior Publication Data

US 2018/0264931 A1  Sep. 20, 2018

(30) Foreign Application Priority Data

Mar. 14, 2017  (KR) .......................... 10-2017-0031859

(51) Int. Cl.
*B60T 5/00* (2006.01)
*B60K 11/08* (2006.01)
*F16D 65/847* (2006.01)

(52) U.S. Cl.
CPC .................. *B60K 11/08* (2013.01); *B60T 5/00* (2013.01); *F16D 65/847* (2013.01)

(58) Field of Classification Search
CPC .... B60T 5/00; F16D 65/847; F16D 2065/788; F16D 2065/1328; B60K 11/04; B60K 11/08; B60K 11/085
See application file for complete search history.

(56) References Cited

U.S. PATENT DOCUMENTS

| 2,136,472 A | * | 11/1938 | Sinclair | B60T 5/00 188/264 R |
| 4,455,045 A | * | 6/1984 | Wheeler | B62D 35/00 105/1.2 |
| 4,653,788 A | * | 3/1987 | Di Giusto | B60K 11/08 188/264 A |
| 4,772,299 A | * | 9/1988 | Bogusz | B01D 45/04 188/264 AA |
| 4,805,747 A | * | 2/1989 | Moedinger | F16D 65/847 188/264 A |
| 4,810,021 A | * | 3/1989 | Burst | B60T 5/00 296/180.1 |

(Continued)

FOREIGN PATENT DOCUMENTS

| JP | 63-156819 U | 10/1988 |
| JP | 2004-338602 A | 12/2004 |

(Continued)

*Primary Examiner* — Emma K Frick
(74) *Attorney, Agent, or Firm* — Morgan, Lewis & Bockius LLP

(57) ABSTRACT

A structure of a brake-cooling duct, which is disposed at one side of an intercooler tank to cool a brake disc using air may include the brake-cooling duct has an air movement channel and a through-hole formed in a side surface thereof to expose the channel to an outside, wherein the brake-cooling duct is disposed close to one side of the intercooler tank so that an external surface of the intercooler tank is exposed to the channel via the through-hole, allowing the air introduced into the channel to be brought into contact with the external surface of the intercooler tank, and thereafter be discharged rearward thereof.

8 Claims, 4 Drawing Sheets

(56) References Cited

U.S. PATENT DOCUMENTS

| | | | | |
|---|---|---|---|---|
| 5,121,818 A * | 6/1992 | McComic | B60T 5/00 | |
| | | | 136/291 | |
| 5,918,663 A * | 7/1999 | Hoglinger | B60R 19/48 | |
| | | | 165/41 | |
| 6,315,091 B1 * | 11/2001 | Nilsen | F16D 65/847 | |
| | | | 188/264 A | |
| 6,945,576 B1 * | 9/2005 | Arentzen | B60K 13/02 | |
| | | | 180/68.3 | |
| 7,086,692 B2 * | 8/2006 | Sebastian | B60K 11/00 | |
| | | | 296/198 | |
| 7,380,869 B2 * | 6/2008 | Nakaya | B62D 25/182 | |
| | | | 296/180.1 | |
| 7,537,072 B2 * | 5/2009 | Sturmon | B60K 11/08 | |
| | | | 165/51 | |
| 7,600,615 B2 * | 10/2009 | Ramsay | B60T 5/00 | |
| | | | 188/264 AA | |
| 7,703,779 B2 * | 4/2010 | Sumey | B60T 5/00 | |
| | | | 280/93.512 | |
| 8,474,557 B2 * | 7/2013 | Wolf | B60T 5/00 | |
| | | | 180/68.1 | |
| 8,631,889 B2 * | 1/2014 | Begleiter | B60T 5/00 | |
| | | | 180/68.1 | |
| 8,708,075 B2 * | 4/2014 | Maurer | B60R 19/52 | |
| | | | 180/68.1 | |
| 8,794,363 B2 * | 8/2014 | Wolf | B60K 11/085 | |
| | | | 180/68.1 | |
| 8,892,314 B2 * | 11/2014 | Charnesky | B60K 11/085 | |
| | | | 180/68.1 | |
| 9,004,241 B2 * | 4/2015 | Browne | B60T 5/00 | |
| | | | 188/264 A | |
| 9,163,685 B2 * | 10/2015 | Carmassi | F16D 65/853 | |
| 9,487,251 B2 * | 11/2016 | Gibson | F16D 65/847 | |
| 9,573,571 B2 * | 2/2017 | Weber | B60T 5/00 | |
| 9,586,474 B2 * | 3/2017 | Nam | B60K 11/08 | |
| 9,623,848 B2 * | 4/2017 | Paul | B62D 21/11 | |
| 9,637,180 B2 * | 5/2017 | Wolf | B60K 11/04 | |
| 9,669,807 B2 * | 6/2017 | Wolf | B60T 5/00 | |
| 9,669,885 B1 * | 6/2017 | Fahland | B62D 37/02 | |
| 9,694,858 B2 * | 7/2017 | Wolf | B62D 37/02 | |
| 9,738,152 B2 * | 8/2017 | Yoon | B62D 35/005 | |
| 9,751,481 B2 * | 9/2017 | Schneider | B60K 11/06 | |
| 9,776,499 B2 * | 10/2017 | Nam | F02B 29/0443 | |
| 9,783,026 B2 * | 10/2017 | Nam | B60H 11/04 | |
| 9,809,108 B2 * | 11/2017 | Ribaldone | B60K 11/085 | |
| 9,827,844 B2 * | 11/2017 | Schneider | B60K 11/04 | |
| 9,863,403 B2 * | 1/2018 | Gaither | F03D 9/32 | |
| 2004/0124022 A1 * | 7/2004 | Schmid | B60K 11/04 | |
| | | | 180/68.1 | |
| 2009/0025993 A1 * | 1/2009 | Hines | B62D 35/00 | |
| | | | 180/68.3 | |
| 2009/0223757 A1 * | 9/2009 | Ballard | F16D 65/847 | |
| | | | 188/264 R | |
| 2011/0308763 A1 * | 12/2011 | Charnesky | B60H 1/3227 | |
| | | | 165/41 | |
| 2012/0071075 A1 * | 3/2012 | Wolf | B60T 5/00 | |
| | | | 454/162 | |
| 2015/0118949 A1 * | 4/2015 | Nam | B60K 13/02 | |
| | | | 454/155 | |
| 2015/0345578 A1 * | 12/2015 | Nightingale | B60K 11/085 | |
| | | | 188/264 AA | |
| 2016/0272257 A1 * | 9/2016 | McKillen | B62D 35/005 | |
| 2018/0093560 A1 * | 4/2018 | Nitsche | B62D 35/02 | |

FOREIGN PATENT DOCUMENTS

| | | |
|---|---|---|
| JP | 2005-112113 A | 4/2005 |
| KR | 10-2015-0112866 A | 10/2015 |

* cited by examiner

STRUCTURE OF BRAKE-COOLING DUCT

CROSS-REFERENCE TO RELATED APPLICATION

The present application claims priority to Korean Patent Application No. 10-2017-0031859, filed on Mar. 14, 2017, the entire contents of which is incorporated herein for all purposes by the present reference.

BACKGROUND OF THE INVENTION

Field of the Invention

The present invention relates to the structure of a brake-cooling duct, which may be coupled to an intercooler, and more particularly, to the structure of a brake-cooling duct, which may be coupled to an intercooler tank, which forms an intercooler to cool air that passes through the intercooler, thereby increasing the cooling performance of the intercooler and ensuring easier mounting thereof.

Description of Related Art

An intercooler is a device that cools air to be suctioned into an engine (before the air is supplied to the engine). Such an intercooler has been mounted in various types of vehicles since it assists an engine having a small capacity in realizing a high output.

The intercooler lowers the temperature of air to be suctioned into the engine, and correspondingly increases the density of the air, thereby increasing the engine output. Generally, the intercooler is used along with a turbo device in which exhaust gas combusted in the engine rotates a turbine to implement compression of air, and is disposed in the middle of an air movement path between the turbo device and the engine so as to cool the air, which has been heated and compressed by the turbine.

The intercooler is divided into an air cooling type in which cooling is implemented by wind induced by a vehicle (i.e. driving wind) and a water cooling type in which cooling is implemented by cooling water. Among these, the air cooling type intercooler is configured by coupling a core unit 3 and an intercooler tank 4 to each other. As illustrated in FIG. 1A, the core unit 3 is disposed on the front lower end of a radiator 2 of a front-end module 1 so as to be directly exposed to the driving wind, and the intercooler tank 4, which is connected to the turbo device and the engine to supply air that has passed through the core unit 3, is disposed on one side (or both sides) of the core unit 3.

Meanwhile, when a high-output engine disposed with the intercooler is mounted in a vehicle, there is a demand for correspondingly high braking performance. That is, in order to enhance brake performance, in a high-performance vehicle, a brake-cooling duct 5 is mounted near the intercooler tank 4 to guide the supply of the driving wind to a brake disc so as to more rapidly cool the brake disc.

The brake-cooling duct 5 is disposed at one side of and distanced from the intercooler tank 4 so that a suction hole thereof faces the front side and a discharge hole thereof faces the brake disc at the rear side thereof. As such, the brake-cooling duct 5 guides the supply of the driving wind to the brake disc so as to cool the brake disc, thereby suppressing a brake judder phenomenon and noise generation due to thermal deformation of the brake disc.

Meanwhile, since the cooling performance of the intercooler has a great effect on the output of the engine, the core unit 3 of the intercooler and the intercooler tank 4, through which the air moves, may be disposed so as to be cooled by the driving wind.

However, in consideration of limitations on the design and layout of a bumper 6 in a situation in which the suction hole of the brake-cooling duct 5 needs to be oriented to face the front side of the bumper 6, as illustrated in FIG. 1B, the area to be exposed to the driving wind may be limited. That is, although the full projected area of both the core unit 3 and the intercooler tank 4 is "A" and the full projected area of the brake-cooling duct 5 is "D", the front surface of the bumper 6 is open only in the portion "C" and the driving wind may not enter the portion "B" in which the intercooler tank 4 is located. In addition, conventionally, the brake-cooling duct 5 and the intercooler have been individually installed, which complicates attachment of the same to a vehicle body.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Therefore, it is necessary to maximize the cooling efficiency of the intercooler and the brake-cooling duct in consideration of limitations on the size and design of the bumper. Various aspects of the present invention are directed to providing the structure of a brake-cooling duct, which may maximize the cooling efficiency of an intercooler and a brake-cooling duct and may ensure easier assembly thereof.

Technical objects to be achieved by the present invention are not limited to those mentioned above, and other objects may be clearly understood by those skilled in the art from the description given below.

In accordance with the present invention, the above and other objects can be accomplished by the provision of a structure of a brake-cooling duct, the brake-cooling duct being configured to cool a brake disc by rearwardly discharging air introduced from a front side thereof and being mounted to be disposed at one side of an intercooler tank, the structure including the intercooler tank, and the brake-cooling duct having an air movement channel defined therein and a through-hole formed in a side surface thereof to expose the channel to an outside of the side surface, wherein the brake-cooling duct is disposed close to one side of the intercooler tank so that an external surface of the intercooler tank is exposed to the channel via the through-hole, allowing the air introduced into the channel to be brought into contact with the external surface of the intercooler tank, and thereafter be discharged rearward thereof.

The brake-cooling duct may be provided with a plurality of bosses at a front side of the through-hole to create an eddy during air movement. The bosses may be disposed to form a matrix.

The external surface of the intercooler tank, on which the through-hole is located, may be provided with a cooling fin to increase a contact area with the air that passes through the channel. The cooling fin may include at least two cooling fins, and the cooling fins may be formed parallel to each other along a direction in which the channel is open to guide a flow of the air.

The external surface of the intercooler tank that faces the brake-cooling duct and the side surface of the brake-cooling duct that faces the intercooler tank may be inclined by an angle at which an upper surface of the intercooler tank and an upper surface of the brake-cooling duct are parallel to each other.

One of the intercooler tank and the brake-cooling duct may be provided with a tip portion for insertion of a bolt, and the intercooler tank and the brake-cooling duct may be fixedly coupled to each other by the bolt inserted into the tip.

The intercooler tank may be formed of a metal material and the brake-cooling duct may be formed of a material having a thermal conductivity lower than that of the material of the intercooler tank.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
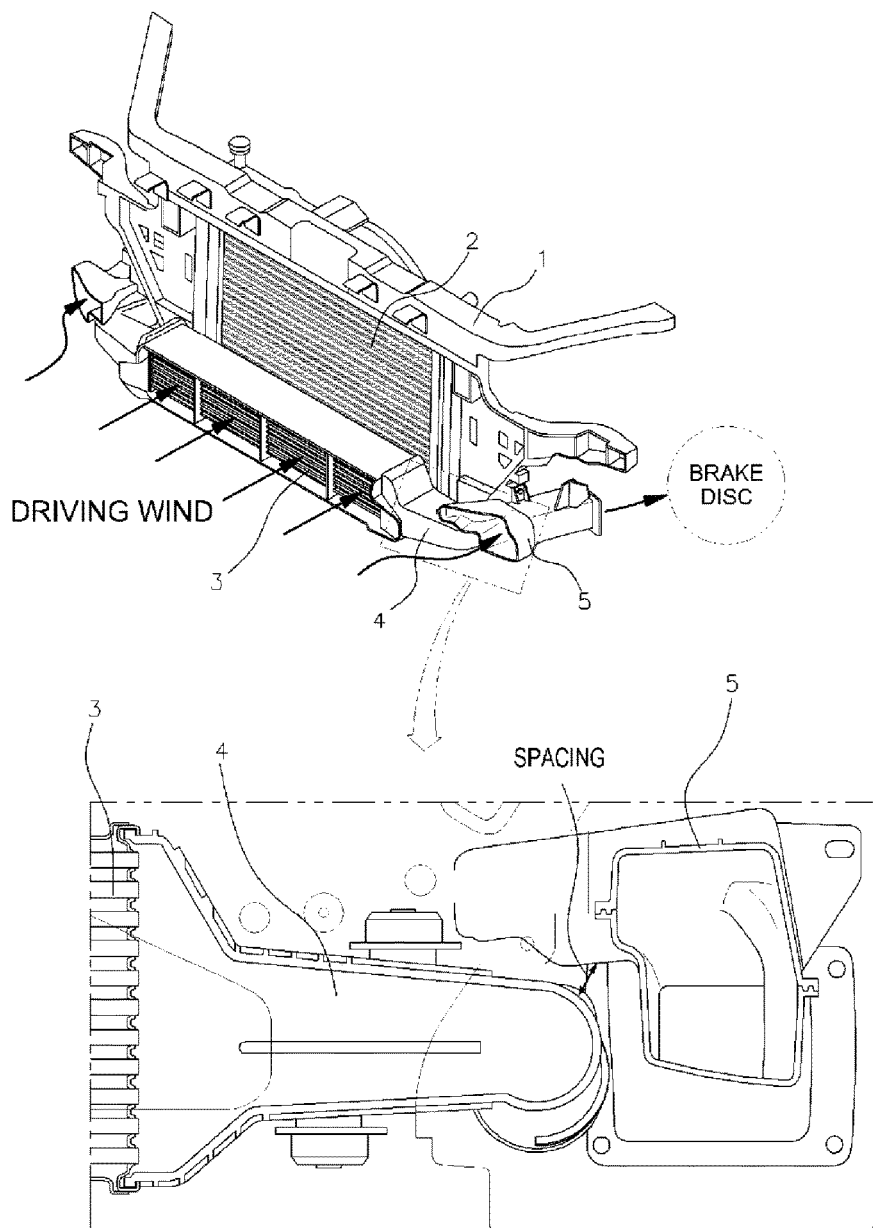
FIG. 1A illustrates a perspective view and a front view of a state in which an intercooler and a brake-cooling duct are mounted to a front-end module according to the related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the embodiments of the present invention, examples of which are illustrated in the accompanying drawings, to allow those skilled in the art to easily understand and reproduce the embodiments of the present invention. However, the present invention may be implemented in various different forms, and are not limited to the embodiments described herein.

To clearly explain an exemplary embodiment of the present invention, illustration of elements having no connection with the description is omitted, and the same or extremely similar elements are designated by the same reference numerals throughout the specification.

In addition, the terms or words used in the specification and claims of the present invention are not interpreted using typical or dictionary limited meanings, and are constructed as meanings and concepts conforming to the technical spirit of the present invention based on the principle that the inventors can appropriately define the concepts of the terms to explain an exemplary embodiment of the present invention in the best manner.

Various aspects of the present invention are directed to providing the structure of a brake-cooling duct, which rearwardly discharges air introduced from the front side thereof to cool a brake disc and is mounted to be disposed at one side of an intercooler tank. Hereinafter, an exemplary embodiment of the present invention will be described in more detail with reference to the accompanying drawings.

Figure 2:
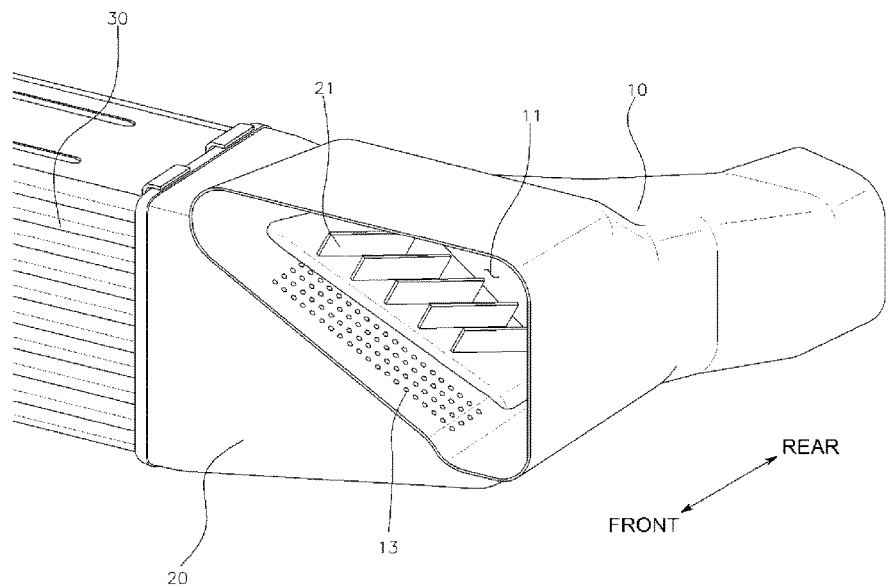
FIG. 2 is a view illustrating a state in which a brake-cooling duct is coupled to an intercooler tank according to an exemplary embodiment of the present invention.
Figure 3:
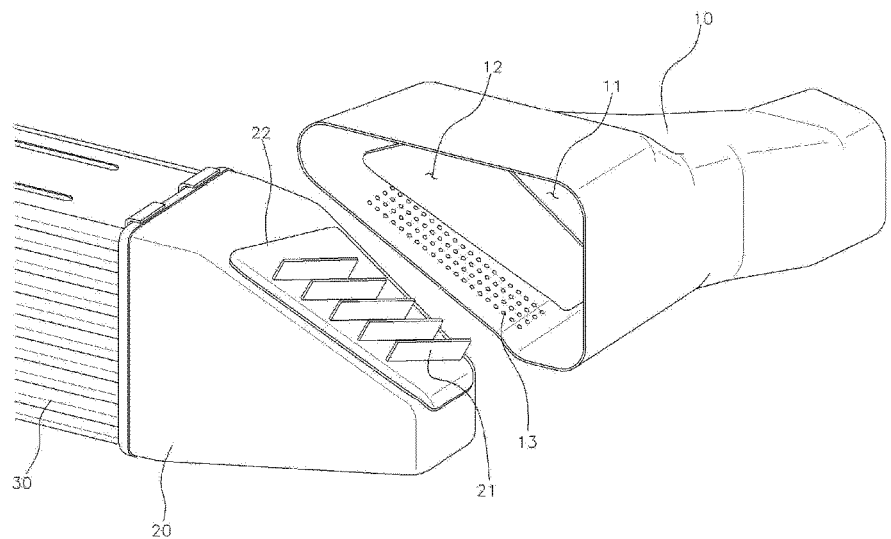
FIG. 3 is a view illustrating a state in which the brake-cooling duct of FIG. 2 is separated from the intercooler tank.

As illustrated in FIG. 2 and FIG. 3, an intercooler tank 20 according to an exemplary embodiment of the present invention is disposed to be coupled to one side or both sides of a core device 30 of an intercooler, and a brake-cooling duct 10 is closely coupled to the external side (the position opposite to the core device 30) of the intercooler tank 20.

The brake-cooling duct 10 is formed into a pipe shape as in a conventional structure so that an air movement channel 11 is defined therein, and is configured such that driving wind, which is introduced from an inlet hole in the front end portion of the channel 11, is discharged to a discharge hole in the rear end portion of the channel 11 to be supplied to a brake disc for cooling the brake disc, and such that a through-hole 12 is formed in the side surface thereof to expose the channel 11 to the outside of the side surface.

In addition, the brake-cooling duct 10 and the intercooler tank 20, as illustrated in FIG. 2, are coupled to each other in a close-contact state. At the present time, the coupling is implemented such that the external surface of the intercooler tank 20 is exposed to the channel 11 via the through-hole 12. Accordingly, the air introduced into the channel 11 is brought into contact with the external surface of the intercooler tank 20 while moving in the channel 11, and thereafter is discharged rearward thereof.

In an exemplary embodiment of the present invention, the intercooler tank 20 is formed of a metal material having relatively high thermal conductivity to ensure efficient heat exchange between the compressed inside air to be supplied to an engine and the air moving in the channel 11, and the brake-cooling duct 10 is formed of a plastic material having lower thermal conductivity and smaller weight than the material of the intercooler tank 20.

Figure 1B:
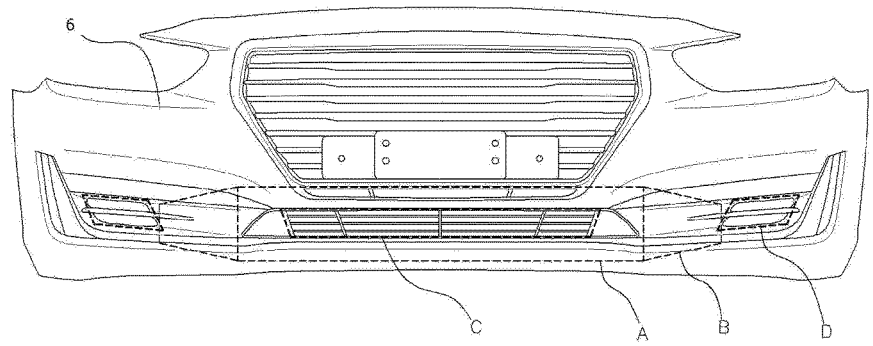
FIG. 1B is a view illustrating a bumper mounted on the front side of the front-end module of FIG. 1A.

In addition, to suit the design of the bumper 6 illustrated in FIG. 1B (i.e. to ensure that any one of the intercooler tank and the brake-cooling duct, which are coupled to each other, does not protrude upward or downward), the close contact portions of the intercooler tank 20 and the brake-cooling duct 10 may have a symmetrical shape.

For example, as illustrated in FIG. 3, the external surface of the intercooler tank 20 that faces the brake-cooling duct 10 and the side surface of the brake-cooling duct 10 that faces the intercooler tank 20 are formed into inclined surfaces respectively, and the inclined surfaces are formed to have an angle at which the upper surface of the intercooler tank 20 and the upper surface of the brake-cooling duct 10 are parallel to each other when the intercooler tank 20 and the brake-cooling duct 10 are coupled to each other (see FIG. 2).

Figure 4:
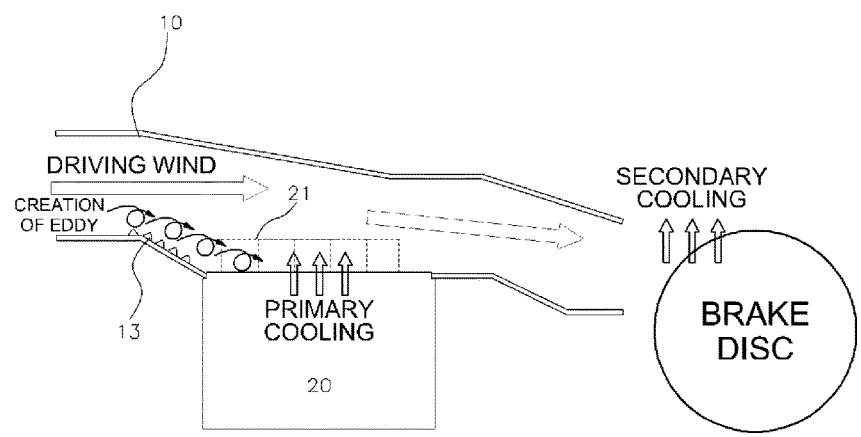
FIG. 4 is a schematic cross-sectional view illustrating the coupled state of the brake-cooling duct and the intercooler tank.

In addition, the brake-cooling duct 10 is provided with a plurality of bosses 13 in a matrix, and the bosses 13 are disposed at the front side of the through-hole 12 to create an eddy during air movement. That is, as illustrated in FIG. 4, the flow rate of the driving wind is reduced by the bosses 13, which increases the time for which the driving wind is in contact with the external surface of the intercooler tank 20 that is exposed to the through-hole 12. Accordingly, when the bosses 13 are additionally formed, the cooling efficiency of the compressed air that passes through the internal to the brake-cooling duct 10 may be further increased.

In addition, the external surface of the intercooler tank 20, on which the through-hole 12 is located, may be additionally provided with cooling fins 21, to increase the contact area with the air that passes through the channel 11. Although the number, shape, and size of the cooling fins 21 are not limited, in the exemplary embodiment of the present invention, a plurality of cooling fins having an elongated plate shape may be provided. In addition, the cooling fins 21 are formed to be located in a protruding portion 22, which protrudes to a predetermined height from the external surface of the intercooler tank 20 to be fitted into the through-hole 12.

At least two cooling fins 21 having an elongated plate shape are formed to be parallel to each other in the direction in which the channel 11 is open (along the contour of the brake-cooling duct 10) to guide the flow of the driving wind, which has a reduced flow rate due to the eddy created by the bosses 13.

Figure 5:
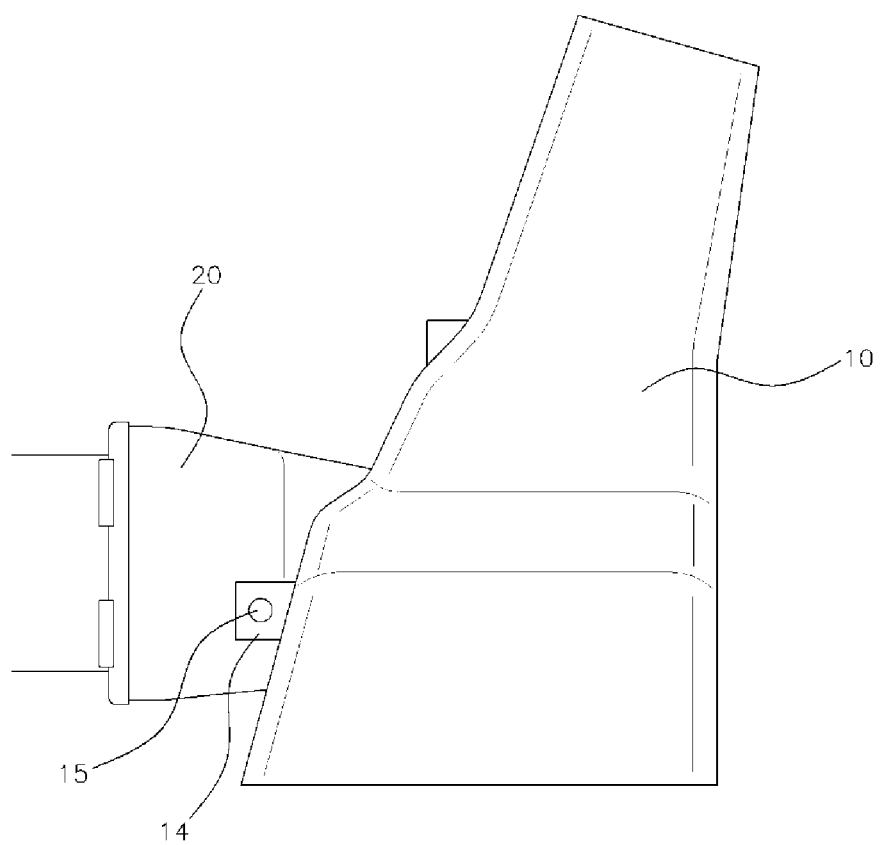
FIG. 5 is a view illustrating a state in which a tip portion having a bolt hole formed therein is bonded to the brake-cooling duct.

In addition, any one of the intercooler tank 20 and the brake-cooling duct 10 is provided with a tip, into which a bolt may be inserted. That is, as illustrated in FIG. 5, when a tip portion 14 having a bolt hole 15 formed therein is formed on the brake-cooling duct 10 and a bolt hole, into which the end portion of a bolt is fastened, is formed in the intercooler tank 20, the intercooler tank 20 and the brake-cooling duct 10 may be fixedly coupled to each other by inserting a bolt into the bolt hole 15.

With the present invention having the above-described configuration, the driving wind introduced into the brake-cooling duct 10 cools the intercooler tank 20, which may maximize the cooling performance of the intercooler.

In addition, although the intercooler tank 20 and the brake-cooling duct 10 are separately provided and coupled to each other to define a space therebetween in the related art, in an exemplary embodiment of the present invention, the brake-cooling duct 10 is mounted to the intercooler tank 20 in close contact therewith, which may minimize the mounting space thereof, resulting in increased efficiency of spatial utilization of a package.

Accordingly, an unavailable area is reduced, which may increase the degree of freedom in the design of, for example, a bumper and a front-end module. In addition, the brake-cooling duct 10 may be mounted in a vehicle in a state in which it is coupled to the intercooler tank 20, which may simplify an assembling process.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a brake-cooling duct, the brake-cooling duct being configured to cool a brake disc by rearwardly discharging air introduced from a front side thereof and being mounted to be disposed at a first side of an intercooler tank, the structure including:
the intercooler tank; and
the brake-cooling duct having an air movement channel defined therein and a through-hole formed in a side surface thereof to expose the channel to an outside of the side surface,
wherein the brake-cooling duct is disposed at the first side of the intercooler tank wherein an external surface of the intercooler tank is exposed to the channel via the through-hole, allowing the air introduced into the channel to be brought into contact with the external surface of the intercooler tank, and thereafter be discharged rearward thereof.

2. The structure according to claim 1, wherein the brake-cooling duct is provided with a plurality of bosses at a front side of the through-hole to create an eddy during air movement.

3. The structure according to claim 2, wherein the bosses are disposed to form a matrix.

4. The structure according to claim 1, wherein the external surface of the intercooler tank, on which the through-hole is located, is provided with a cooling fin to increase a contact area with the air that passes through the channel.

5. The structure according to claim 4, wherein the cooling fin includes at least two cooling fins, and the at least two cooling fins are formed in parallel to each other along a direction in which the channel is open to guide a flow of the air.

6. The structure according to claim 1, wherein the external surface of the intercooler tank that faces the brake-cooling duct and the side surface of the brake-cooling duct that faces the intercooler tank are inclined by an angle at which an upper surface of the intercooler tank and an upper surface of the brake-cooling duct are in parallel to each other.

7. The structure according to claim 1, wherein one of the intercooler tank and the brake-cooling duct is provided with a tip portion for insertion of a bolt, and the intercooler tank and the brake-cooling duct are fixedly coupled to each other by the bolt inserted into the tip portion.

8. The structure according to claim 1, wherein the intercooler tank is formed of a metal material and the brake-cooling duct is formed of a material having a thermal conductivity lower than that of the material of the intercooler tank.

* * * * *